United States Patent Office 3,021,291
Patented Feb. 13, 1962

3,021,291
PREPARATION OF CONCRETE CONTAINING EXPANDED POLYMERIC PARTICLES
Gilbert Thiessen, Pittsburgh, Pa., assignor to Koppers Company, Inc., a corporation of Delaware
No Drawing. Filed Dec. 15, 1958, Ser. No. 781,183
8 Claims. (Cl. 260—2.5)

This invention relates to the production of cellular concrete.

The term "concrete" as commonly used and as used herein refers to a mixture and a product of the mixture of cement and water with coarse aggregates (such as gravel, crushed rock, slag) and fine aggregates (such as sand, rock screenings and slag). The term "cement" as used herein is intended to denote cementateous material having as active constituents magnesium or calcium derivatives, exemplary of which are Portland cement, lime and gypsum. The term "cellular concrete" refers to concrete which is lighter in weight than normal concrete because of pores or voids therein. These voids are usually produced by adding to the concrete mixture a suitable air entraining or a suitable gas forming material, as a porosity producing agent. The use of a gas forming material has an advantage over the use of an air entraining material in that a slight swelling of the mixture is produced and this forces the concrete into better contact with the mold and also aids in preventing segregation of materials.

When air entraining materials are used to produce the cellular concrete, the semi-fluid concrete mixture is whipped and the air entraining material holds the air in the mixture, thereby producing a froth or foam which remains as the concrete sets so that the concrete product is filled with pores or voids. Suitable air entraining agents, such as Vinsol, Darex, lignin-sulfonic acid, and licorice root residues, are well known. It is well known that tallows and oils which, in themselves are not foaming or air entraining materials, but depend upon a saponification reaction, may be interground with the dry cement so as to effect a saponification reaction with the alkaline constituents of the cement and become air entraining agents, and that the alkali metal salts of sulfonated oils or fatty acids, which are themselves foaming agents, can either be interground with the cement or added to the cement as water and aggregate are added.

In producing cellular concrete by use of a gas forming material, aluminum is usually incorporated in the concrete mix to react with the hydrating hydroxides in the concrete so as to permeate the mass with minute hydrogen bubbles. This aluminum may be in the form of unpolished spherical pellets, free from grease, or for slower reactions, the aluminum may be in the form of polished powder, such as is used for pigment in paints; the polished powder generally being fine flakes, mostly through a 300–400 mesh seive having a high specific surface and are usually made by a stamping process and then revolved in a drum with a lubricant to give the flakes a luster. The amount of aluminum used depends upon the weight and strength desired for the final product and usually ranges from 0:1 to 1 oz. per hundred pounds of cement used. To hasten this action, an alkali such as the hydroxide of sodium or potassium or other metal above aluminum in the electromotive series such as calcium, magnesium, and the like may be incorporated in the concrete mix.

The consistency of the concrete mixture is generally controlled by controlling the amount of water in the mixture. In turn, the consistency required is determined by practical considerations, such as the configuration of the molds, and the residence time of the mixture in the molds determines the water content. If the article is to be removed immediately from the molding machine, it may be desirable to use the lowest proportion of water possible so as to have a thick, or somewhat dry, mix which is placed under pressure in the mold; but if the material can remain for a longer time in the mold, it may be desirable to use a thinner mix, i.e., have more water present. Customary practice is to have the final mixture in the mold for 4 to 12 hours, then remove the shaped mixture from the mold, and cure it in an autoclave under high pressure because steam-cured products have advantages from the standpoint of durability, of smaller volume change when in service, of attaining in a few hours a completeness of hydration and hardness that would require weeks under normal job curing conditions.

It has become conventional to use cellular concrete for the manufacture of structural units, such as building blocks, slabs, beams, pipe and the like for the building industry. Cellular concrete also finds everyday use in small decorative units such as statuary and bird baths as well as in bath tubs and burial vaults. Cellular concrete products have the advantages of lightness in weight (cellular concrete may weigh less than half the weight of normal concrete and may contain as much as fifty percent voids) and of sound and heat insulation. Cellular concrete products as known heretofore also have the characteristics because of the porous and permeable nature of the product, of absorbing and transmitting a considerable amount of moisture. These characteristics are particularly undesirable in the building industry as they may provide a damp atmosphere.

An object of my invention is to provide a novel method for manufacturing a cellular concrete product that has an ability to resist impregnation by water and vapor.

This invention improves the foregoing conventional methods of making cellular concrete by incorporating into the concrete mixture prior to the casting of the mixture a polymeric material which will expand under the influence of heat during the curing sufficiently to fill the voids in the concrete, and the polymeric material, being substantially impervious to water, seals these voids against the passage of moisture.

Polymeric materials which expand under the influence of heat are well known. Such materials include, for example, expandable polyethylene, alpha methyl styrene and styrene acrylonitrile copolymers. Advantageously used for this purpose, however, are particles of expandable polystyrene which normally had incorporated therein an expanding agent. The expanding agent may be a volatile aliphatic or cycloaliphatic hydrocarbon, which has a boiling point lower than the softening point of the polymer, such as petroleum ether, pentane, hexane, heptane, cyclopentane, cyclohexane, cyclopentadiene and mixtures thereof. A typical expandable polystyrene such as, for example, "Dylite," has incorporated therein from 5–15% of a hydrocarbon such as hexane, which is normally liquid under ambient conditions but which is readily volatized and has a boiling point below the melting point of polystyrene. While the shape and size of the polymeric particles are not critical, the particles should be as small as can be obtained in a practical manner. "Dylite" expandable polystyrene, as virgin beads, for example, is in the form of small beads which pass through a 40 mesh and remain on a 60 mesh screen (U.S. standard), having about the same density as that of water and thus is easily incorporated into the concrete mixture so as to have an even distribution of the beads throughout the mix. As the concrete having incorporated therein the virgin expandable polystyrene beads or the partially expanded beads is subjected to the steam curing steps the beads expand under the influence of heat and precisely fill the voids formerly filled by the air or gas.

The amount of expandable polymeric material to be used is a practical matter and may range from as low as one percent by weight of the mixture of cement and aggregate to more than fifty percent. However, the use of a greater amount of polymeric material than is required to expand and fill the voids has no appreciable advantage. The expandable polymeric material may be added to the dry mixture of cement or aggregate or to the mixture with the water or after the water has been added.

An additional factor of low density is obtained when the expandable polystyrene is partially expanded by heating in an atmosphere of steam by the use of equipment such as disclosed in co-pending application Serial No. 689,195 prior to incorporating the polymer into the concrete mixture. A disadvantage of the partially expanded or pre-expanded polystyrene, however, is that due to the great difference in density between the polystyrene particles and the other components of the mixture, and the final product may lack homogeneiy.

In accordance with this invention, the shaped product is subjected to the conventional steam curing. Standard curing temperatures range from 240°–365° F. with the steam under pressures of between 10 and 150 pounds per square inch gage and the curing operations lasting for a period of from 4 to 12 hours. However, higher or lower pressure of steam and of temperature may be employed depending upon the curing time and the hardening desired.

It will be apparent that the proportions of cement, aggregate, porosity producing agent, and expandable polymeric material are practical matters depending upon the strength desired for the final product, the weight or density desired for the product, shape and size of the product, the type and condition of aggregate used, type of cement used and the equipment in which the product is cast. These factors, as is well known, are taken into consideration by the operator in preparing the mixture and are varied by the operator to produce the mixture best suited for the purpose for which it is to be used. As pointed out above, the amount of water added to the dry mixture depends upon, for a given set of conditions, the production system, i.e., the length of time the charge is to remain in the mold.

The following examples will illustrate further the practice of the novel process of the invention.

*Example I*

100 parts by weight of Portland cement and 400 parts by weight of slag were mixed with 0.1 part by weight of the sodium salt of di-butyl naphthalene sulphonic acid and 10 parts by weight of expandable polystyrene beads. Sufficient water was added to form a rich creamy slurry which was then beaten to a frothy pulp. This mixture was then poured into forms of the desired shape and permitted to set. After about 4 hours the concrete, still contained in the mold, was placed in an autoclave under 15 to 20 pounds steam pressure for about 7 hours. The pressure is slowly increased at the start of the indurating process and slowly decreased at the end of the process to prevent the possibility of strain developing within the concrete structure. The steam curing increases the compressive strength of the concree structure and also permits the polystyrene beads to expand into the voids within the concrete filling them completely and sealing them against the transmission of water and humidity.

*Example II*

94 pounds of Portland cement was mixed with 6½ gallons of water, 7 oz. of sodium hydroxide and 40 pounds of expandable polystyrene beads. To this was added a dispersion of one oz. of 300 mesh aluminum powder in ½ gal. of water containing a small amount of ethymethyl cellulose. The mixture was stirred thoroughly to insure a homogeneous mixture after which it was poured into molds of the desired shape and allowed to expand for 10 hours. The excess foamed concrete was then cut-off level with the top opening of the mold which is then transferred to an autoclave where the process was carried out as in Example I.

The foregoing has described a novel process for producing cellular concrete having a low density, i.e., that is light in weight, and having the additional desirable properties of not transmitting or absorbing appreciable quantities of water.

What is claimed:

1. A method of producing cellular concrete which comprises incorporating into a concrete mixture having therein a porosity producing agent for providing voids in said mixture polymeric material in the form of small particles, said polymeric material being selected from the group consisting of polymers of styrene and ethylene, said polymeric material having an expanding agent incorporated therein and being in an amount to fill the voids left by the porosity producing agent after expansion of said polymeric material upon the application of heat, casting said concrete mixture, allowing said concrete mixture to set until said porosity producing agent has acted to produce voids and subjecting said mixture to heat whereby the polymeric material expands under the influence of heat to fill said voids and thereby prevent absorption or transmission of water by the concrete.

2. The method of claim 1 wherein the polymeric material is expandable polystyrene.

3. The method of claim 1 wherein the polymeric material is polystyrene having incorporated therein 5–15% of a volatile hydrocarbon.

4. A method of producing cellular concrete products which comprises incorporating into a concrete mixture having therein a porosity producing agent for providing voids in said mixture expandable polymeric material in the form of small particles, said polymeric material being selected from the group consising of polymers of styrene and ethylene, said polymeric material having an expanding agent incorporated therein and being in an amount to fill the voids left by the porosity producing agent after expansion of said polymeric material by the application of heat, casting said concrete mixture, allowing said concrete mixture to set until said porosity producing agent has acted to produce voids and curing said cast mixture with steam whereby the polymeric material expands under the influence of heat to fill said voids, thereby preventing the absorption and transmission of water by the product.

5. A method of producing cellular concrete products of desired shape which comprises incorporating into a concrete mixture having therein a porosity producing agent expandable polystyrene in the form of small particles, said polystyrene having a hydrocarbon expanding agent incorporated therein and being in an amount to fill the pores produced by the porosity producing agent, casting said concrete mixture to the desired shape, permitting sufficient set of said concrete mixture for said porosity producing agent to act to produce voids and steam curing said casting whereby said polystyrene expands under the influence of heat to fill said pores and thereby prevent the absorption or transmission of water through the concrete.

6. The method of claim 5 wherein the expandable polystyrene is polystyrene particles having incorporated therein 5–15% of a volatile hydrocarbon.

7. A method of producing cellular concrete which comprises incorporating into a concrete mixture, which has therein a porosity producing agent for providing voids, polystyrene particles to the extent of 1 to 50 percent by weight of the mixture, which particles have incorporated therein 5–15 percent of a volatile hydrocarbon, casting said mixture to a desired shape in a mold and permitting said mixture to set for 4–12 hours, and thereafter curing said mixture with steam at a temperature of from 240–365° F. and under a pressure of 10–150 pounds per square inch for a period of from 4–12 hours whereby the heat expands said particles to fill the voids produced by the porosity producing agent and thereby prevent absorption or transmission of water by the concrete.

8. The proces of claim 7 wherein the porosity producing agent is powdered aluminum.

References Cited in the file of this patent

UNITED STATES PATENTS

| | | |
|---|---|---|
| 1,899,137 | Crume | Feb. 28, 1933 |
| 2,133,245 | Brice et al. | Oct. 11, 1938 |
| 2,205,735 | Scherer | June 25, 1940 |
| 2,491,487 | Faulwetter | Dec. 20, 1949 |
| 2,496,895 | Staley | Feb. 7, 1950 |
| 2,744,291 | Stastny et al. | May 8, 1956 |
| 2,793,129 | Klein | May 21, 1957 |
| 2,797,201 | Veatch et al. | June 25, 1957 |